United States Patent [19]

Meadows et al.

[11] Patent Number: 5,412,306
[45] Date of Patent: May 2, 1995

[54] METHOD AND APPARATUS FOR CHARGING A BATTERY

[75] Inventors: Vernon Meadows, Coral Springs; Anaba A. Anani, Lauderhill; Jose M. Fernandez, Plantation, all of Fla.

[73] Assignee: Motorola, Inc., Schaumburg, Ill.

[21] Appl. No.: 120,499

[22] Filed: Sep. 14, 1993

[51] Int. Cl.⁶ .......................................... H01D 10/44
[52] U.S. Cl. ........................................ 320/20; 320/22; 320/23
[58] Field of Search ............ 320/20, 21, 22, 23, 320/24

[56]  References Cited

U.S. PATENT DOCUMENTS

| | | | |
|---|---|---|---|
| 2,662,211 | 12/1953 | Marko et al. | 324/425 |
| 2,864,055 | 12/1958 | Kordesch et al. | 324/427 |
| 3,288,642 | 11/1966 | Kordesch | 429/59 |
| 3,531,706 | 9/1970 | Mullersman | 320/20 |
| 3,534,241 | 9/1970 | Wilson et al. | 320/33 |
| 3,538,415 | 11/1970 | Wilson | 320/32 |
| 3,852,652 | 12/1974 | Jasinski | 320/35 |
| 3,886,428 | 5/1975 | Marcharg | 320/39 |
| 3,987,353 | 10/1976 | Macharg | 320/39 |
| 4,270,080 | 5/1981 | Kostecki | 320/24 |
| 4,503,378 | 3/1985 | Jones et al. | 320/20 |
| 4,639,655 | 1/1987 | Westhaver et al. | 320/14 |
| 4,746,852 | 5/1988 | Martin | 320/20 |
| 4,767,977 | 8/1988 | Fasen et al. | 320/20 |
| 4,806,840 | 2/1989 | Alexander et al. | 320/20 |
| 5,122,722 | 6/1992 | Goedken et al. | 320/22 |

OTHER PUBLICATIONS

Technical Notes article by K. V. Kordesch "Charging Method for Batteries, Using the Resistance Free Voltage as Endpoint Indication", The Electrochemical Society, Aug. 1972, pp. 1053–1055.

Primary Examiner—Steven L. Stephan
Assistant Examiner—Robert Nappi
Attorney, Agent, or Firm—Pedro P. Hernandez; Kenneth M. Massaroni

[57] ABSTRACT

A rechargeable battery (208) is charged using a charger (202). The charge current provided by charger (202) is a stepped-down pulse where the battery charge current rate change is determined by the rise time of the battery voltage. The charge pulse sequence is repeated after the polarization recovery period is completed. The polarization recovery time of the previous period will determine if the stepped-down pulse has to be modified.

5 Claims, 4 Drawing Sheets

METHOD AND APPARATUS FOR CHARGING A BATTERY

TECHNICAL FIELD

This invention relates in general to battery charging techniques and more specifically to a method and apparatus for charging a battery more efficiently.

BACKGROUND

Many battery chargers today utilize a dual rate charge sequence in which the battery under charge is charged at a fast rate for a period of time and then the battery is charged at a slower, or "trickle" rate, once the battery has reached a predetermined charge level. During the charging of rechargeable batteries such as Nickel-Cadmium (NiCd) or Nickel-Metal-Hydride (NiMh) batteries, most charger termination sequences (the time when the charger switches from the rapid charge rate to the trickle or slower charge rate) are activated either by looking at the rise in heat of the battery over a predetermined period of time ($\Delta T$ method), or the change in battery voltage over a given period of time ($\Delta V$ method). Both the $\Delta T$ and $\Delta V$ methods of charge rate switching cause battery overcharge conditions which excessively heat up the batteries under charge. The heat up of the batteries in turn causes the batteries useful life to be shortened. Another problem with present day chargers is that they tend to keep charging the battery at a fast charge rate even when the battery's charge state has changed to a charge level in which the fast charge rate is no longer desirable. A need thus exists in the art for a method and apparatus for charging a battery in order to achieve improved charge efficiency and minimize the generation of harmful heat during the charging process.

DETAILED DESCRIPTION OF THE PREFERRED EMBODIMENT

Figure 1:
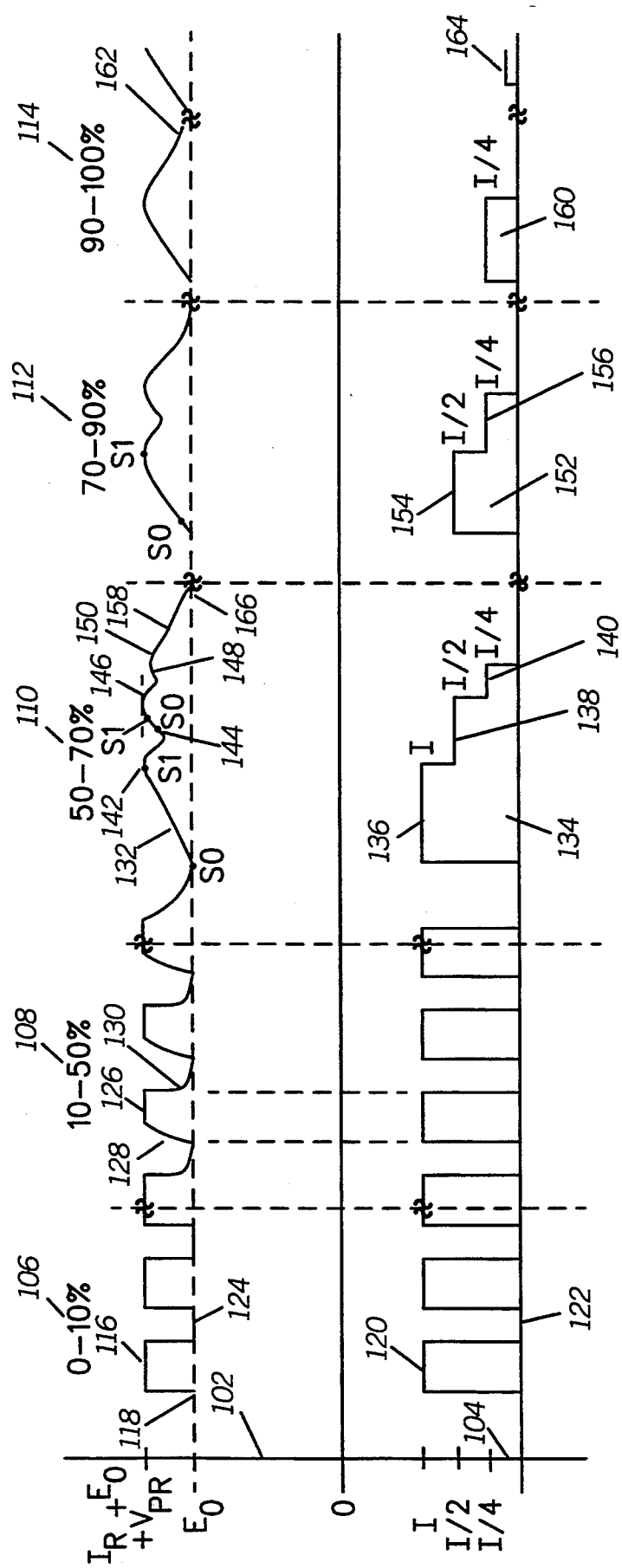
FIG. 1 is a graph showing the voltage of a battery under charge and the charging current in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a graph of the battery voltage 102 of a battery undergoing charge and a graph of the charging current 104 applied to the battery pack (e.g., NiCd, NiMh) in accordance with the invention is shown. For purposes of clarity, the graph is broken down into 5 sections or stages of charge starting with a first period 106, in which the battery is approximately between 0 and 10% charged, a second period in which the battery is approximately 10 to 50% charged, a third period where the battery is between 50 to 70% charged, a fourth period where the battery is between 70 to 90% charged and a fifth period in which the battery is between 90 and 100% charged. In order to provide as much detail of the invention as possible, FIG. 1 just shows one or two charge pulses during each of the charge periods mentioned above. One skilled in the art will understand that the time in each of the sections will depend on many factors including the present charge of the battery, charge capacity of the battery, etc.

During the first and second charging periods (i.e., battery is between 0 to 50% charged) the charge sequence of the present invention charges the battery using a pulse charge having a specified duty cycle. For example, if the battery which is being charged is a 2000 milli-ampere-hour (mall) capacity battery, the charge sequence for the first two charge periods 106 and 108 would preferably generate a charge pulse having a maximum current (I) of 2 amperes and a duty cycle having an "on" time of 20 seconds and an "off" time of one second. The amount of current and the duty cycle of the pulses will depend on the capacity of the battery, type of battery, etc.

During the first charging period 106, the voltage curve 116 of the battery undergoing charge increases in voltage as a current charge pulse cycle 120 is applied. The battery voltage increases to a maximum voltage 116 equal to the battery's open circuit voltage (E0) plus the internal "IR" (resistance times current applied) voltage drop of the battery plus the primary cell voltage of the battery (Vpr). As the first current charge pulse 120 is applied, the battery voltage curves very closely resemble a square-wave if the battery is fully discharged. The battery voltage starts at the open circuit (E0) voltage 118 which for Nickel-Cadmium batteries is equal to 1.3 volts per battery cell. As soon as charge pulse 120 is terminated during time period 122, the battery voltage returns to its open circuit voltage (E0), as shown during time period 124.

As the battery begins to gather charge, the voltage curve of the battery begins to change as shown during battery voltage cycle 126. The rise time 128 of the battery is primarily a function of the chemical resistance state of the two battery electrodes. Electrodes of a fully discharged battery (e.g., NiCd) has an electrical state of high resistance because the chemical state is Nickel Hydroxide at the positive terminal and Cadmium Hydroxide at the negative electrode. The two chemicals mentioned are insulators and exhibit high resistance. There are other resistances in series that stay relatively constant such as the electrolyte, and separator in the battery cell. Aging and "wear-out" are large factors that affect non-electrode resistances.

As the battery electrodes change from an insulative state to a conductive state, due to diffusion of ions on the electrodes of the battery cell, a surface charge collects on the electrodes, which is represented by the formula C=QN, where C=capacitance, a=charge, and V=voltage. Surface charge collects on the electrodes of the battery under charge when the electrodes become saturated with material (oxygen and hydrogen ions). This charge which is collected on the electrodes produces a capacitance effect and also inhibit diffusion of ions in the electrodes. As more and more current flows into the battery cell, more charges accumulate around the battery electrodes. The voltage potential built-up is called the "polarization voltage". The rise time of the battery voltage decreases during this time since the capacitance of the battery cell increases. Battery cell voltage rise time is fast during the charging of a fully discharged battery cell as shown during charging periods 106 and 108, and begins to increase as the battery cell becomes charged, as shown in charging periods 110, 112, and 114. For example, voltage rise time 128 in period 108 takes longer than during charging period 106. This capacitance phenomena can be used to increase charge efficiency in accordance with the invention by detecting for its presence, and adjusting the charge current which will be adjusted depending on the built-up charge potential of the battery.

The present invention continuously monitors the battery voltage and calculates the change in voltage over time ($\Delta V/\Delta t$) of the battery during a given charge pulse cycle. Once the change in voltage over the predetermined period of time is greater than a predetermined value, which in the preferred embodiment is set to equal 2.5 Volts/second for the first voltage slope determination, the charger then determines the point at which the slope of $\Delta V/\Delta t$ is equal to zero. In the preferred embodiment, once the slope of $\Delta V/\Delta t$ reaches 0, as shown at time 142, the charger steps down the charge pulse current to a second predetermined current level 138. This stepped down charge current in the preferred embodiment is equal to half of the original charge current. For the example, we are still using a 2000 maH capacity battery, which was originally was being charge during charge period 106 with a 2 ampere pulse 120. Therefore, charge step 138 can be calculated dividing 2 amperes by 2($\frac{1}{2}$) which is equal to 1 ampere. This lowered current charge step 138 allows for the polarization voltage of the battery to recover since less current is being applied to the battery. The charger then continues to monitor the battery voltage and determines when $\Delta V/\Delta t$ (voltage slope) is greater than half the original slope value of 2.5 Volts/second, or 1.25 Volts/second, as shown during period 144. Once $\Delta V/\Delta t$ is greater than half of the original voltage slope value, the charger again calculates to find the point where the voltage slope is equal to zero, as shown in 146. At this point, the battery charger drops the current to a fourth of the original charge current rate ($\frac{1}{4}$) 136 or 2 amperes/4 or approximately 0.50 amperes which is the charge rate for final charge rate step 140. The charger again calculates for the voltage slope 148 being greater than a predetermined voltage slope which in this final case is set equal to one-third the original slope (2.5 Volts/second divided by 3) or approximately 0.83 Volts/second. Once the third voltage slope is reached, monitor circuit 228 then determines the point in which the voltage slope is equal to zero in order to cut-off the charge current pulse.

In the preferred embodiment, the first complete staircase pulse 134 is implemented using three current steps 136 (1), 138 ($\frac{1}{2}$) and 140 ($\frac{1}{4}$). Although three steps are used in the preferred embodiment, many other different number of charge steps can be utilized for the pulse. The number of charge steps found in each charge pulse will depend on many factors, including the resolution capability of the charger to calculate the voltage slope, type and charge capacity of battery to be charged, etc. Also, the change in current from one charge step to the next does not have to follow the linear drop used in the preferred embodiment but can be customized to the size and type of battery to be charged. Other factors that will have an influence on the size of charge steps to have include the amount of temperature rise that can be tolerated by the battery being charged, the battery users requirements in terms of how long he can wait for a battery to be recharged, etc.

During voltage recovery time or decay time 130 (t decay), the voltage of the battery begins to slow down as the battery is building up charge due to the build up of ions in the electrodes of the battery cell. As the battery becomes more charged, it takes longer for the ions to become depleted from the battery electrodes, thereby causing a slow down in the voltage recovery time 130. This voltage recovery time for the battery increases as the battery becomes more charged.

As the battery becomes more and more charged over time, the voltage characteristics of the battery also change, as shown during charge period four 112. The present invention compensates for these changes in battery characteristics by changing the charge pulse applied to the battery over time. During charging period four 112, the staircase pulses 152 of the present invention are reduced to two steps, with the maximum current for the first pulse 154 being a maximum of $\frac{1}{2}$, which in present example is equal to 1000 milliampere. The decision to cut back to two steps from three is based on the voltage decay recovery time 158 reaching a predetermined value. The voltage decay recovery time 158 is the time it takes the battery to go from voltage level 150 to the open circuit (Eo) voltage 166 of the battery. This voltage recovery time increases as the battery becomes more charged. In the preferred embodiment, when the recovery time is greater than one second, the stair step charge pulse is cut down to two steps, as shown in pulse 152. Or from any previous number of steps to a some lesser number of steps in other applications. The trigger point for going from the three step pulse 134 to the two step pulse 152 in the preferred embodiment, although set for one second can be set differently based on the type of battery undergoing charge, charge capacity of the battery, the amount of current being applied to the battery, etc.

The pulse charging sequence of the present invention continues until the pulses become one step pulses, like pulse 160. This one step pulse charging sequence continues until the battery's voltage recovery time reaches one second again, as shown during recovery time 162, at which point the battery charger begins a standard trickle charge sequence 164 in order to maintain the battery fully charged. For example, the charger automatically changes the charge current to a continues C/30 charge rate, where "C" is the capacity of the battery. In this example, this would yield a trickle rate of approximately 67 milli-amperes.

Figure 2:
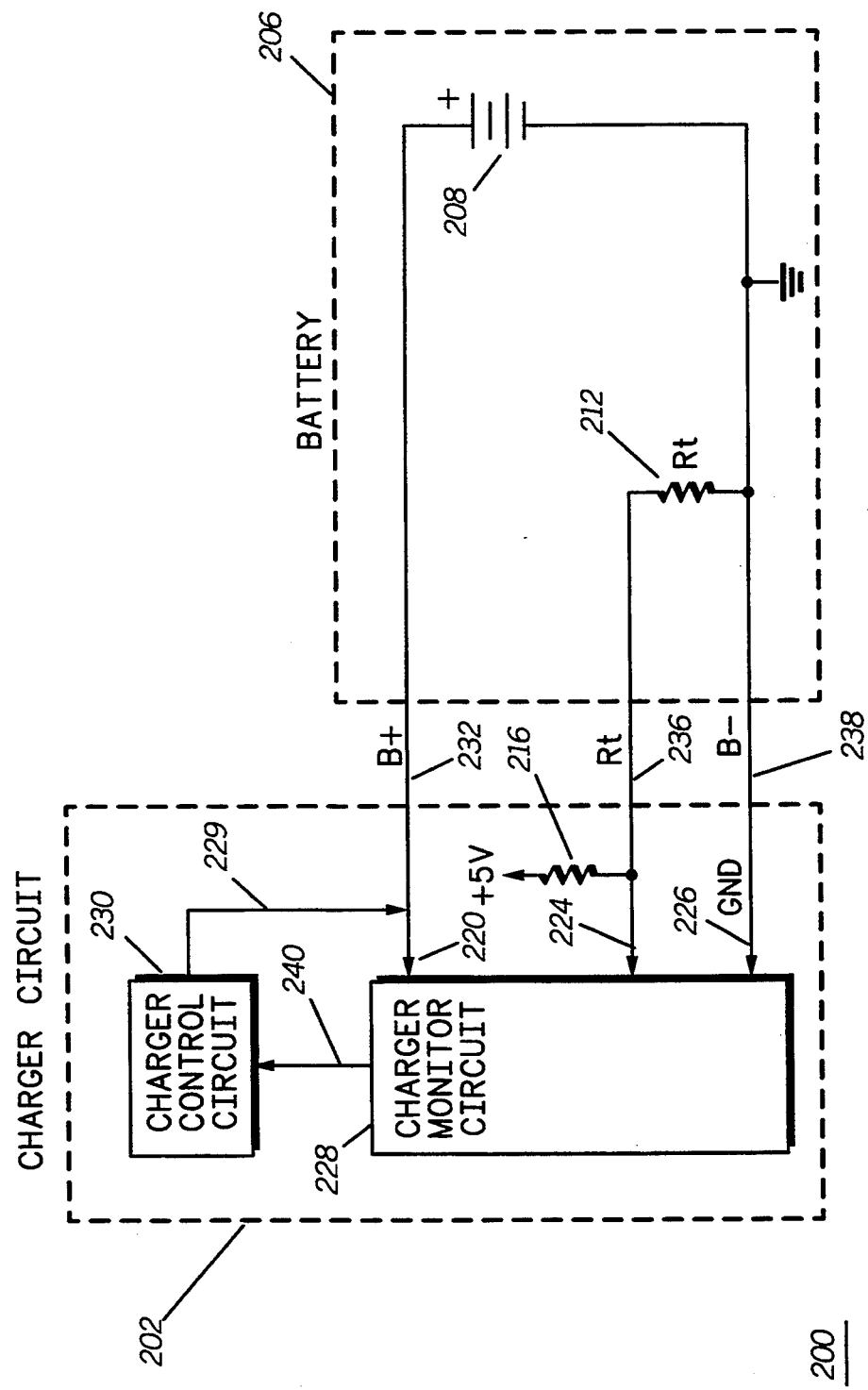
FIG. 2 is a block diagram of a battery charger in accordance with the present invention.

In FIG. 2, there is shown a battery charging system consisting of a charger 202 and radio battery pack 206 in accordance with the present invention. Battery pack 206 contains one or more battery cells 208, which determine the voltage and charge capacity of battery 206. Also included as part of battery pack 206, is a battery temperature indicator such as thermistor (Rt) 212 for determining the temperature of the battery being charged. Thermistor 212 allows the charger to stop the charging sequence if the battery reaches a predetermined temperature. For example, if it is getting to hot due to battery failure, etc.

Charger 202 consists of a charger monitor circuit 228, which can consist of a well known microprocessor or microcontroller such as known in the art and appropriate control software in order to implement the pulse charging scheme of the present invention. Charger monitor circuit 228 controls charger control circuit 230 which provides current to battery 206 in order to charge battery 206. Charger control circuit 230 can be implemented as a programmable variable current source circuit as is well known in the art. A control signal is transmitted by charger monitor circuit 228 to charger control circuit 230 via bus 240, the control signal informs charger control circuit 230 on how much current to source via line 229 to battery pack 206.

Charger monitor circuit 228 contains two analog to digital (A/D) ports 220 and 224. A/D port 220 monitors the voltage on the B+ line, while A/D port 224 senses the resistance of thermistor Rt 212 in order to monitor the battery for changes in temperature. A/D port 224 includes an external pullup resistor 216 which is used to help determine the resistance of Rt 212, by determining the voltage level at A/D port 224.

In a typical charging sequence in accordance with the invention, charger monitor circuit 228 first determines the capacity of the battery to be charged (battery pack 206) by one of many known ways. For example, the capacity of battery pack 206 can be determined by using a well known capacity resistor inside of battery pack 206 (not shown) which is indicative of the battery capacity. The capacity resistor can be determined by monitor circuit 228 in much the same way as Rt 212 is determined. Once the capacity of the battery is determined, the pulse charging sequence as discussed in FIG. 1 is commenced. A/D port 220 continuously monitors the voltage of battery 208 and charger monitor circuit 228 calculates the voltage slope ($\Delta V/\Delta t$) as well as determines when the slope is equal to zero, and the voltage recovery time of battery 208 as previously discussed with relation to FIG. 1. Monitor circuit 220 also determines when to switch the charge pulse on/off, when to step down the charger rate, etc.

Figure 3:
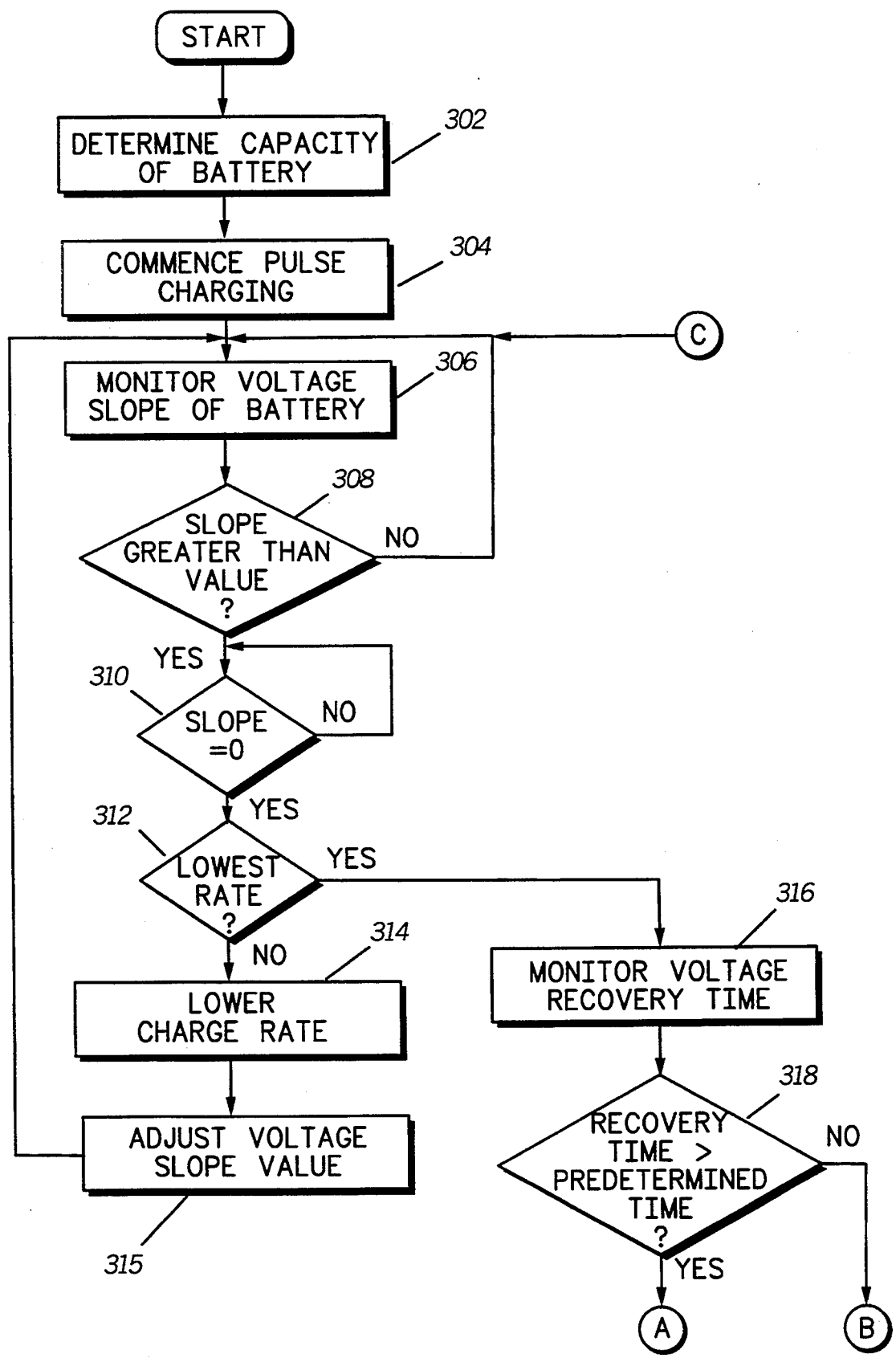
FIGS. 3 and 4 show a flowchart of a charging sequence in accordance with the present invention.
Figure 4:
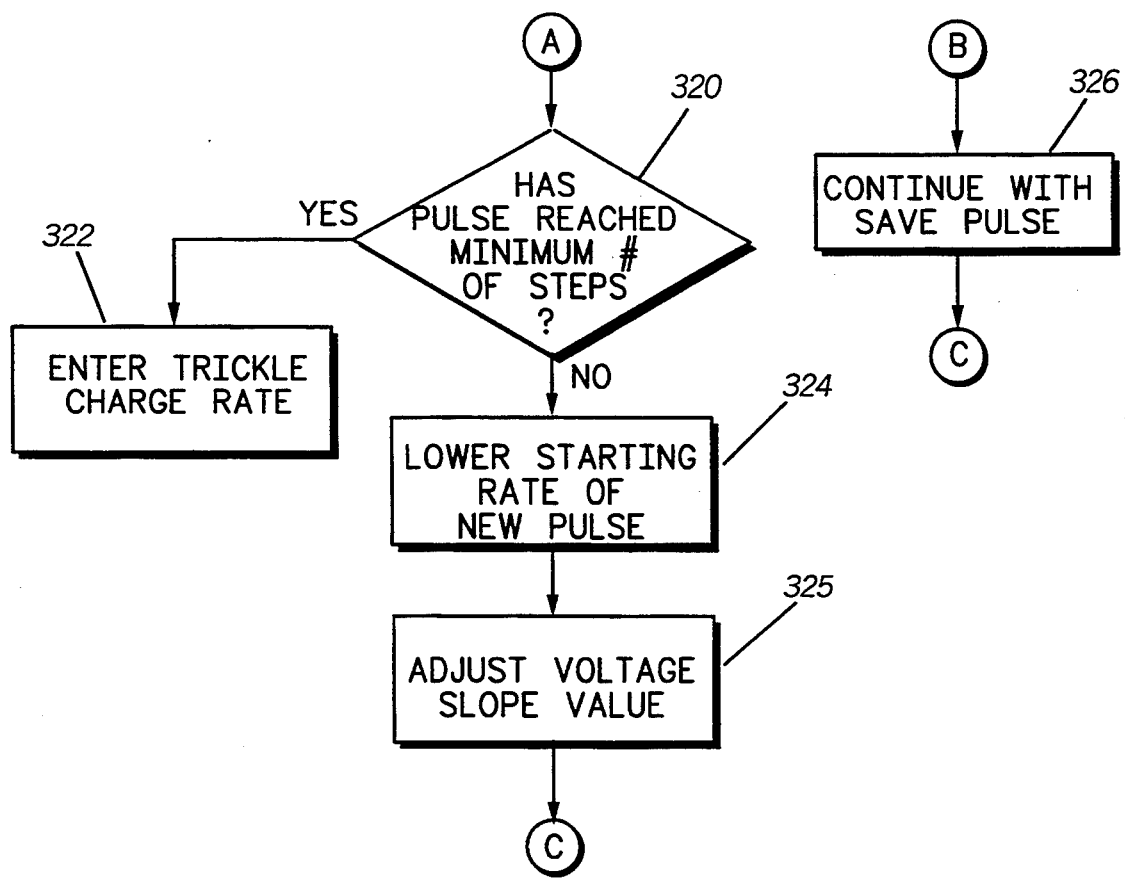

Referring now to FIGS. 3 and 4, a flowchart showing a charge sequence in accordance with the invention is shown. In step 302, the capacity of the battery is determined (this step can be omitted if the charger only charges one type and size of battery. In step 304, the charge sequence is commenced. Charger 202 continuously monitors the voltage of battery 208, via port 222, and calculates the voltage slope. If the voltage slope of battery 206 is not greater than a predetermined value, which in the preferred embodiment is equal to 2.5 Volts/second, the routine in step 308, returns to step 306. If the voltage slope is greater than 2.5 Volts/second, the routine continues on to step 310. In step 310 it is determined if the voltage slope is equal to zero or approximately zero depending of the resolution of the monitoring circuit. If the slope is not equal to zero, charger 202 continues to monitor slope. If the slope is equal to zero, in step 312, it is then determined if the lowest charge rate (charge step) has been reached for that particular charge pulse cycle. If the lowest charge step has not been reached, in step 314 the charge current is lowered to the next lower step. For example, as shown in FIG. 1, in pulse 134, if charging at a rate of "1" in step 136, the current would be lowered to a second lower rate of "½" in step 138. In step 315, the voltage slope value which is used by monitor circuit 228 to compare with is decreased (e.g., from 2.5 volts/second to 1.25 volts/second, etc.). After the charge rate and voltage slope value have been lowered, the routine returns to step 306.

If in step 312 the lowest charge rate (last charge step) has been reached, the charger stops charging the battery and monitors the voltage recovery time via port 220. In step 318, if the recovery time is greater than a predetermined period of time, which in the preferred embodiment is set for 1 second, the routine goes to step 320. If the recovery time back to the open circuit voltage (Eo) takes less than one second, the routine goes to step 326. In step 320, the routine determines if the current pulse has reached the minimum number of steps. For example, if the charge pulses range from 3 current rate steps to one step, and the last pulse was one step, the routine enters a trickle rate charge in step 322. If in step 320, it is determined that the minimum number of charge step pulses has not been reached, the starting current for the new charge pulse is started at the next lower charge rate in step 324. For example, if the last charge pulse was pulse 134 (a three step pulse with the first step starting at a current rate of "1"), the new pulse sequence begins with a two step pulse such as pulse 152 having an initial charge rate lower than "1", such as "½"). After the charge rate has been lowered for the new pulse sequence in step 324, the voltage slope value which monitor circuit 228 is looking for is also decreased in step 325. The routine goes back to step 306 after performing step 325.

In summary, the charge current in the present invention is a stepped-down pulse where the current rate change is determined by the rise time of the battery voltage. As the charge current is reduced by a stepped amount in accordance with the invention, the polarization voltage potential of the battery cell is decreased, allowing more ions to be diffused until the next build up of voltage occurs. Between pulses, the charger 202 in accordance with the invention, monitors the voltage recovery time of the battery to determine if to continue with the current stair-step pulse sequence, modify the current pulses, or enter a trickle charge mode. The present invention provides for a more efficient method of charging batteries by providing different charge levels to the battery depending on the condition of the battery. This not only provides for quicker charging times, but also reduces the chances of damaging the batteries due to excessive heat being generated during the charge sequence since the amount of charge is varied to accommodate the batteries current conditions. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for charging a battery, the battery having a battery voltage, comprising the steps of:
    charging the battery at a first charge rate;
    monitoring the battery voltage while it is being charged at the first charge rate;
    calculating the voltage slope of the battery;
    determining when the voltage slope of the battery reaches a predetermined value;
    determining when the voltage slope reaches zero after the voltage slope of the battery has reached the predetermined value;
    charging the battery at a second charge rate which is lower than the first charge rate when the voltage slope is equal to zero;
    discontinuing the charging of the battery;
    monitoring the voltage of the battery in order to determine how long it takes for the battery voltage to reach a predetermined voltage level after the charging of the battery has been discontinued; and commencing to charge the battery again when the battery voltage has reached the predetermined voltage level.

2. A method for charging a battery as defined in claim 1, wherein the step of commencing to charge the battery again, comprises:

determining of the time it took to reach the predetermined voltage level is greater than a predetermined time;

charging the battery at the first charge rate if the time it took to reach the predetermined voltage was less than the predetermined time;

and charging the battery at the second charge rate if the time it took to reach the predetermined voltage was greater than the predetermined time.

3. A method for charging a battery having a voltage slope using stair-step charge pulses having a plurality of charge rates including a first charge rate and a last charge rate, comprising the steps of:

(a) commencing to charge the battery using a first stair-step charge pulse at one of said plurality of charge rates;

(b) monitoring the voltage slope of the battery;

(c) determining when the voltage slope of the battery reaches a first predetermined value;

(d) determining if the voltage slope of the battery is equal to approximately zero after the voltage slope of the battery has reached the first predetermined value of step (c);

(e) lowering the charge rate of the first stair-step charge pulse to another of said plurality of charge rates;

(f) repeating step (b);

(g) determining when the voltage slope reaches a second predetermined value which is lower than the first predetermined value; and (h) discontinuing the first stair-step charge pulse if the charge rate which was performed in step (e) was the last charge rate from among the plurality of charge rates.

4. A method for charging a battery as defined in claim 3, further comprising the steps of:

(i) monitoring the time it takes the battery voltage to decay to a predetermined level after the stair-step charge pulse in step (h) is discontinued; and (j) commencing to charge the battery using a second stair-step charge pulse that starts with a charge rate that is lower than the charge rate used in step (a) if the time it takes the battery voltage to decay to the predetermined level is greater than a predetermined amount of time.

5. A method for charging a battery, comprising the steps of:

(a) commencing to charge the battery at a first charge rate;

(b) determining a voltage rise time of the battery while it is being charged at the first charge rate;

(c) charging the battery at a second charge rate that is lower than the first charge rate if the voltage rise time of the battery in step (b) reaches a predetermined voltage slope;

(d) repeating step (c) using a lower charge rate and lower voltage slope than those used in step (c) during every new repetition of step (d) until a predetermined charge rate is reached;

(e) discontinuing to charge the battery after charging the battery at the predetermined charge rate of step (d) for a period of time (f) determining a voltage decay recovery time for the battery after step (e) is performed; and (g) repeating steps (a) through (d) if the voltage decay recovery time is reached before a predetermined period of time has elapsed.

* * * * *